United States Patent
Barnett

(10) Patent No.: US 6,448,891 B2
(45) Date of Patent: Sep. 10, 2002

(54) WIRELESS REMOTE TIRE PARAMETER MEASUREMENT METHOD AND APPARATUS

(75) Inventor: Ronald J. Barnett, Santa Rosa, CA (US)

(73) Assignee: GeoMat Insights, LLC, Santa Rosa, CA (US)

(*) Notice: Subject to any disclaimer, the term of this patent is extended or adjusted under 35 U.S.C. 154(b) by 0 days.

(21) Appl. No.: 09/859,357

(22) Filed: May 17, 2001

Related U.S. Application Data

(62) Division of application No. 09/351,500, filed on Jul. 12, 1999.

(51) Int. Cl.[7] .............................................. B60Q 1/00
(52) U.S. Cl. ...................... 340/438; 340/442; 340/443; 340/446; 340/447; 340/449; 340/467
(58) Field of Search .................................. 340/438, 442, 340/443, 446, 447, 449, 467, 461, 448, 445

(56) References Cited

U.S. PATENT DOCUMENTS

| | | | | |
|---|---|---|---|---|
| 2,345,679 A | * | 4/1944 | Linse | 73/600 |
| 4,717,905 A | * | 1/1988 | Morrison, Jr. et al. | 340/438 |
| 5,274,355 A | | 12/1993 | Galan | |
| 5,749,984 A | * | 5/1998 | Frey et al. | 340/444 |
| 5,801,305 A | * | 9/1998 | Kawai et al. | 340/438 |
| 5,926,087 A | * | 7/1999 | Busch et al. | 340/438 |
| 6,011,463 A | * | 1/2000 | Cormier, Sr. | 340/447 |

FOREIGN PATENT DOCUMENTS

DE     2925130 A1     1/1981

\* cited by examiner

*Primary Examiner*—Jeffery Hofsass
*Assistant Examiner*—Daniel Previl
(74) *Attorney, Agent, or Firm*—The Law Office of Jessica Costa, P.C.; Jessica Costa

(57) ABSTRACT

The present invention is a novel technique and system that allows the pressure of a tire to be remotely monitored by sensing a tire parameter indicative of the tire's pressure without mounting any device on the tire itself, while the tire is or is not rotating. In the illustrative embodiment, a tire parameter indicative of the pressure inside the tire, such as the temperature, acoustical signature, or shape of the tire, is measured remotely with a remotely mounted sensor. The measured parameter is compared to a range of known acceptable limits for that particular parameter, and a warning signal is generated if the measured parameter is not within that range of acceptable limits.

6 Claims, 9 Drawing Sheets

WIRELESS REMOTE TIRE PARAMETER MEASUREMENT METHOD AND APPARATUS

CROSS REFERENCE TO RELATED APPLICATIONS

This is a divisional of copending application Ser. No. 09/351,500 filed on Jul. 12, 1999.

FIELD OF THE INVENTION

The present invention pertains generally to tire pressure sensor devices, and more particularly, to a method and apparatus for remotely sensing the pressure of a tire by monitoring a tire parameter that is indicative of the pressure of a tire.

BACKGROUND OF THE INVENTION

Premature wear of a tire is due to under- and/or over-inflation. Under-inflation wears the side edges of the tire footprint; over-inflation wears the middle of the tire footprint.

Tire temperature is critical for tire integrity. Tire temperature is a function of tire pressure,. weight load, rotational speed, and outside temperature, among other factors such as tire construction. A tire is temperature rated and is designed to rotate below the rated maximum temperature and speed. As the speed of rotation of the tire increases, the repetition rate of flexure increases, thereby causing the temperature of the tire to increase. The potential of tire failure (i.e., "blow out") increases when the maximum rated safe temperature is exceeded.

Prior art techniques and devices for monitoring tire temperature and pressure include systems which sense the pressure inside a tire by utilizing a pressure sensor located within the tire itself. A difficulty in implementing such a system is determining how to communicate the output of the pressure sensor located within the rotating tire to a warning display typically located in a fixed position on the vehicle's dashboard.

One example of such a system is described in U.S. Pat. No. 5,285,189, which teaches a tire pressure monitoring system that utilizes radio frequency (RF) signals transmitted from transmitters located within the tires to a dedicated external receiver. In this system, the transmitter includes a microcontroller coupled to a pressure sensor located within the tire for generating and transmitting encoded radio signals at the same carrier frequency. The encoded radio signals include tire pressure information and transmitter device identification information, which is useful for identifying from which tire the tire pressure information is transmitted. A receiver located on the block of the vehicle receives the encoded radio signal and decodes the transmitted information to provide the vehicle operator an alarm if low tire pressure is detected. One problem with this system is the excessive implementation cost. In addition, the placement of separate microcontrollers in the mechanically and thermally harsh environment of each tire increases the potential damage to the pressure sensors. Another problem with this system is electromagnetic interference (EMI). The radio receiver is vulnerable to noise and other interfering radio signals. Also, the transmitter in the tire can cause interference with other radio devices within the car or nearby cars.

In other prior art wireless tire temperature and pressure monitoring devices, a transceiver device is attached to the tire itself. This is problematic for two reasons. First, it requires more complicated communication. If either the transceiver in the tire or on the block of the vehicle fails, the entire system fails. Second, because a transceiver device must be mounted on the tire, the system requires cooperation between the vehicle manufacturer and the tire manufacturer. It would be desirable to eliminate the requirement for a transceiver device on the tire itself in order to allow the system to be tire manufacturer independent and to reduce the number of required components and complexity and therefore the likelihood of system failure.

Accordingly, a need exists for a new and improved technique for monitoring, measuring, and reporting tire temperature and pressure to detect out-of-rating conditions that could lead to tire failure.

SUMMARY OF THE INVENTION

The present invention is a novel technique and system that allows the pressure of a tire to be remotely monitored by sensing a tire parameter indicative of the tire's pressure without mounting any device on the tire itself and while the tire is rotating. In the illustrative embodiment, a tire parameter indicative of the pressure inside the tire such as the temperature, acoustical signature, or shape of the tire, is measured remotely with a remotely mounted sensor. The measured parameter is compared to a range of known acceptable limits for that particular parameter, and a warning signal is generated if the measured parameter is not within that range of acceptable limits. Preferably, the measured parameter and/or the pressure, as derived from the measured parameter, is displayed in a location (e.g., the dashboard of the vehicle) convenient to the operator of the device on which the tire is mounted in order to provide visible notification.

In accordance with the invention, a parameter of a tire that is indicative of the tire pressure is remotely monitored by a remote sensor. The remote sensor measures the parameter of the tire to generate a measured parameter. The parameter measurement is monitored by a measurement processor which compares the measurement itself to a set of acceptable parameter threshold limits and generates a warning signal if measurement is not within the required limits. Alternatively, the measurement is used to derive another parameter (such as the actual tire pressure or another parameter indicative of the tire pressure), which is compared to a set of acceptable parameter threshold limits. If the derived parameter is not within the required limits, a warning signal is generated.

In a first illustrative embodiment, the remote sensor is implemented with an infrared (IR) detector which measures the temperature of the tire, from which the actual pressure is calculated or from which the tire pressure is inferred.

In a second illustrative embodiment, the remote sensor is implemented with an acoustical transducer that measures the acoustical signature of the tire. The remote sensor in this embodiment may be implemented using a variety of known sensors, including an ultrasound detector, a microphone, or an accelerometer, or any equivalent thereof.

In a third illustrative embodiment, the remote sensor is implemented with a distance detector that measures the shape of the tire, such as the width of the tire as indicated by the relative distance between the remote sensor and a predetermined point on the tire. The remote sensor in this embodiment may be implemented with a camera, an ultrasound detector, a microphone, an infrared detector, a microwave oscillator, or any known or hereinafter known equivalent thereof.

Preferably, the measurement processor receives a set of reference parameters which are used to determine whether the measured parameter is within the acceptable limits. The determination may be based only on the measured parameter itself for the conditions indicated by the set of reference parameters. Alternatively, the measured parameter may be used along with the set of reference parameters to derive either the actual tire pressure itself or yet another parameter that is indicative of the tire pressure. The measurement processor then determines whether the actual derived tire pressure or derived parameter is within the acceptable limits for the conditions.

In one embodiment, there is provided a lookup table that contains a set of reference parameter values and their corresponding threshold limits.

The invention allows the tire pressure to be monitored at any non-zero rotational speed of said tire. In addition, if the third embodiment is used, that is, where the measurement is a parameter indicative of the shape of the tire (such as the relative distance between the sensor and a predetermined point on the tire), the tire pressure can be monitored when the tire is not rotating as well.

Preferably, the tire parameter monitoring apparatus includes a trend analyzer which monitors the history of the parameter measurements from which it is able to detect trends (e.g., increasing tire temperature, yet still within the acceptable threshold limits), and generates a trend indicator when a trend is detected.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel method and apparatus for monitoring the pressure of a tire is described in detail hereinafter. The invention is described within that context of automobile tires by way of example only and not limitation. The principles of the invention may be applied to any mechanism comprising a pressurized tire.

Figure 1:
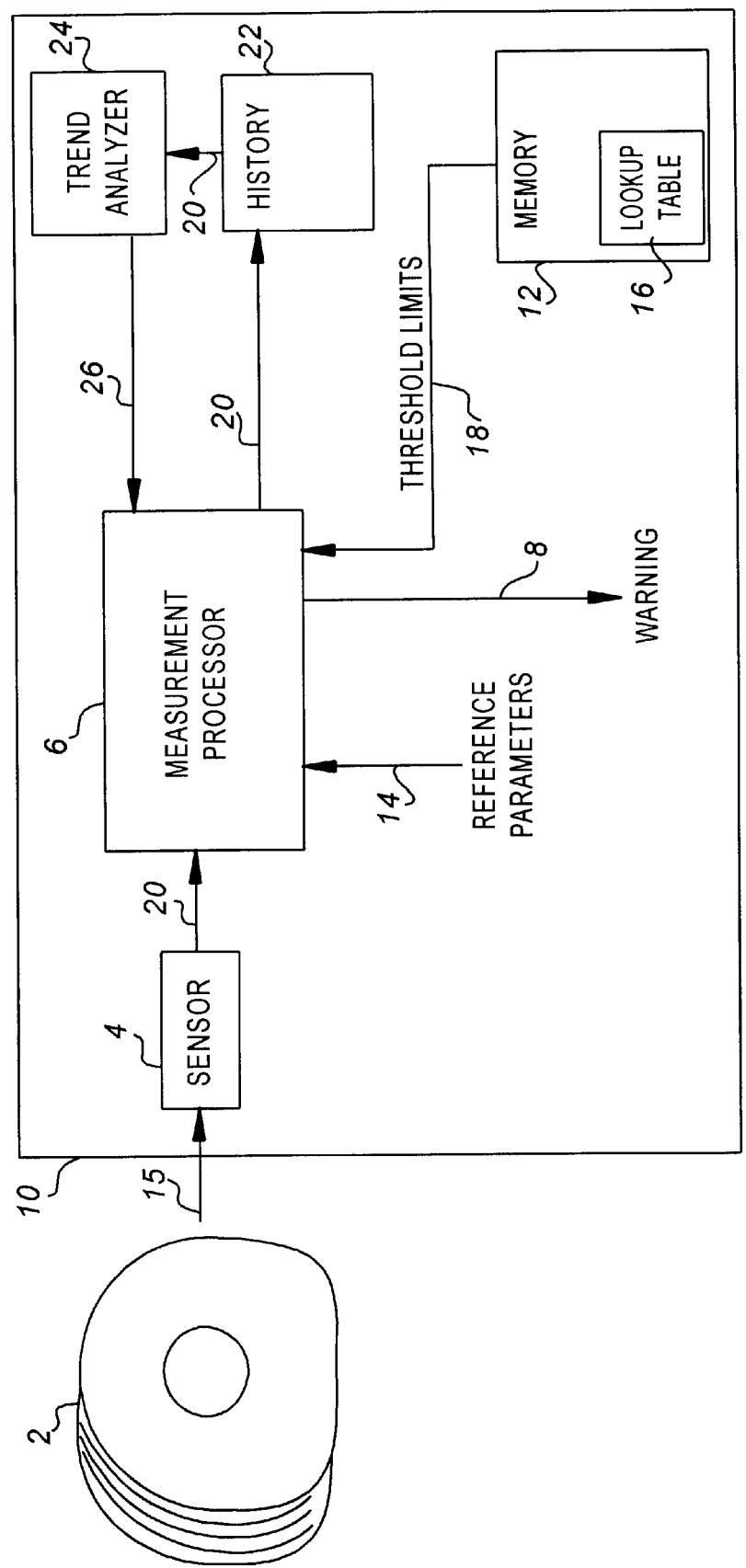
FIG. 1 is a block diagram of a system in which the invention is implemented.

There is shown in FIG. 1 a system 10 in which the invention is implemented. System 10 includes a sensor 4 in communication with a measurement processor 6. Sensor 4 measures a parameter 15 of a tire 2 from a remote distance from the tire 2. In one embodiment, illustrated in FIG. 2A, sensor 4 comprises an infrared (IR) detector 42 and the measured parameter 20 $T_{msrd}$ is the temperature of the rotating tire 2. In an alternative embodiment, illustrated in FIG. 2B, sensor 4 is an acoustic transducer 44 such as an ultrasound detector 44a, a microphone 44b or an accelerometer 44c, and the measured parameter $A_{msrd}$ is the acoustical signature of the rotating tire 2. In yet another alternative embodiment, illustrated in FIG. 2C, sensor 4 is a distance detector 46 such as a camera 46a, an ultrasound transducer 46b such as an ultrasound transmitter/detector combination, an acoustic transducer 46c such as a speaker/microphone combination, microwave oscillator 46d, or optical transducer 46e such as a laser transmitter/detector combination, and the measured parameter 20 $DIST_{msrd}$ represents the shape of the tire 2, as represented, for example, by the distance between the sensor 4 and the bottom portion of the tire $DIST_{actual}$.

Figure 2A:
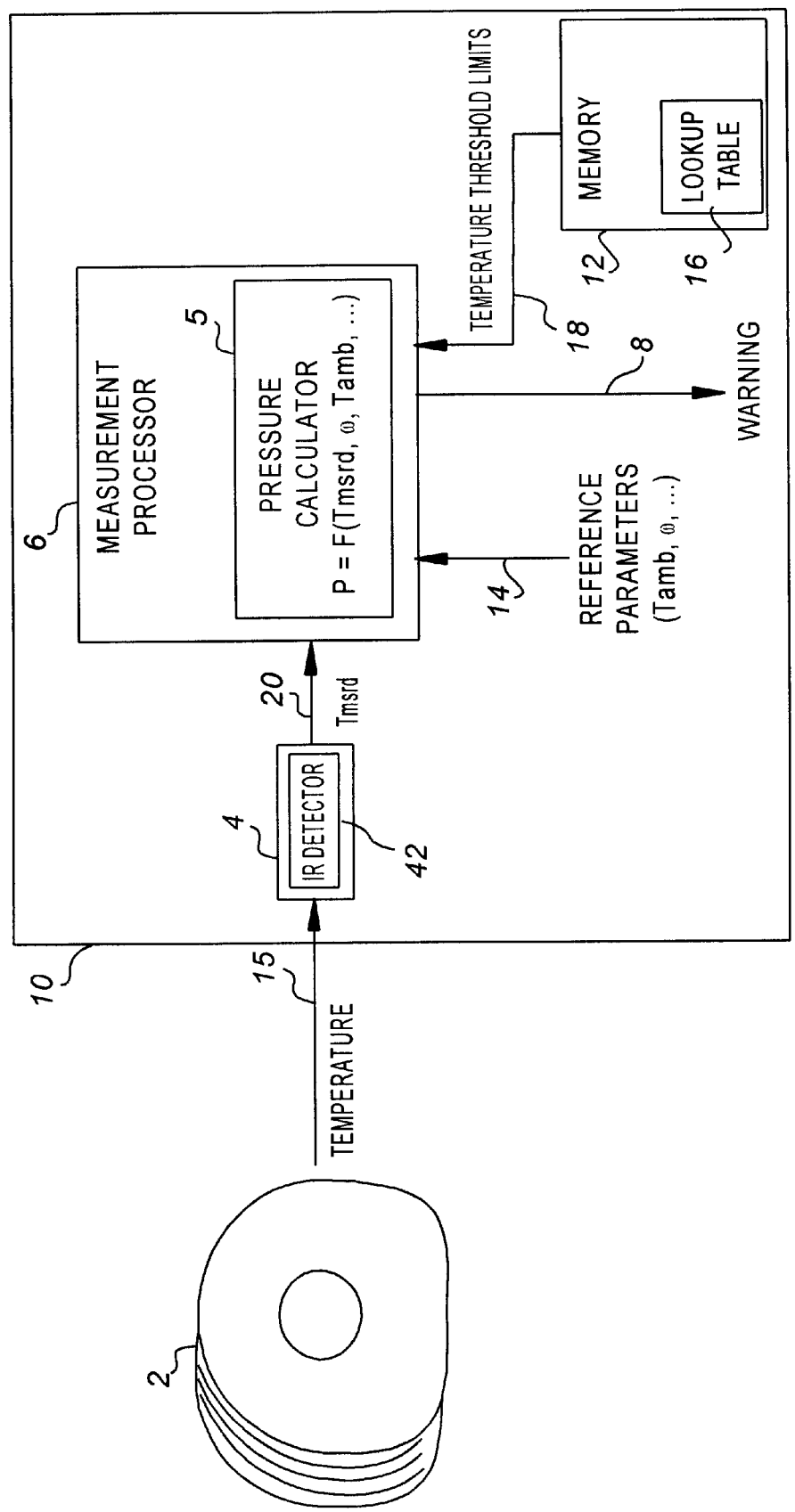
FIG. 2(a) is a block diagram of a first embodiment of a system implemented in accordance with the invention.

In the first illustrative embodiment shown in FIG. 2A, an IR detector 42 is used to measure the tire temperature. Because the measured temperature is related to the pressure of the tire ($P=f(T_{msrd}, T, T_{amb}$, tire loading, construction and cooling factors, etc.), where $T_{msrd}$ is the measured temperature of the tire, T is the rotational speed of the tire, $T_{amb}$ is the ambient temperature of the air surrounding the tire, and the cooling factors include such parameters as air speed and temperature, whether it is raining or snowing, etc.), the tire pressure is inferred from the measured temperature Tmsrd. A key to success in determining tire temperature is calibrating out most of the factors that influence tire temperature other than the pressure such as rotational speed, outside temperature, tire construction, etc. Here, most of the factors are calibrated out by automatic measurement of tire temperature when not rotating, when the car is in cruise control, and comparing these measurements with outside air temperature. Also, all four (or sixteen for sixteen-wheeled vehicles) tire temperatures are measured simultaneously so factors like rain or road surface conditions can be accounted for. In this case, the one tire with a fault will stand out from the others when all tire temperatures are displayed simultaneously. The processor will trip an alarm in this tire temperature unbalanced condition. In addition to a regular over-temperature fault. Also, the tire temperature indication provides additional information such as uneven tire loading (e.g., if weight is unevenly distributed in the vehicle, those tires carrying more weight will run hotter). This feature is particularly useful, for example, when used in 16-wheel trucks.

Figure 2B:
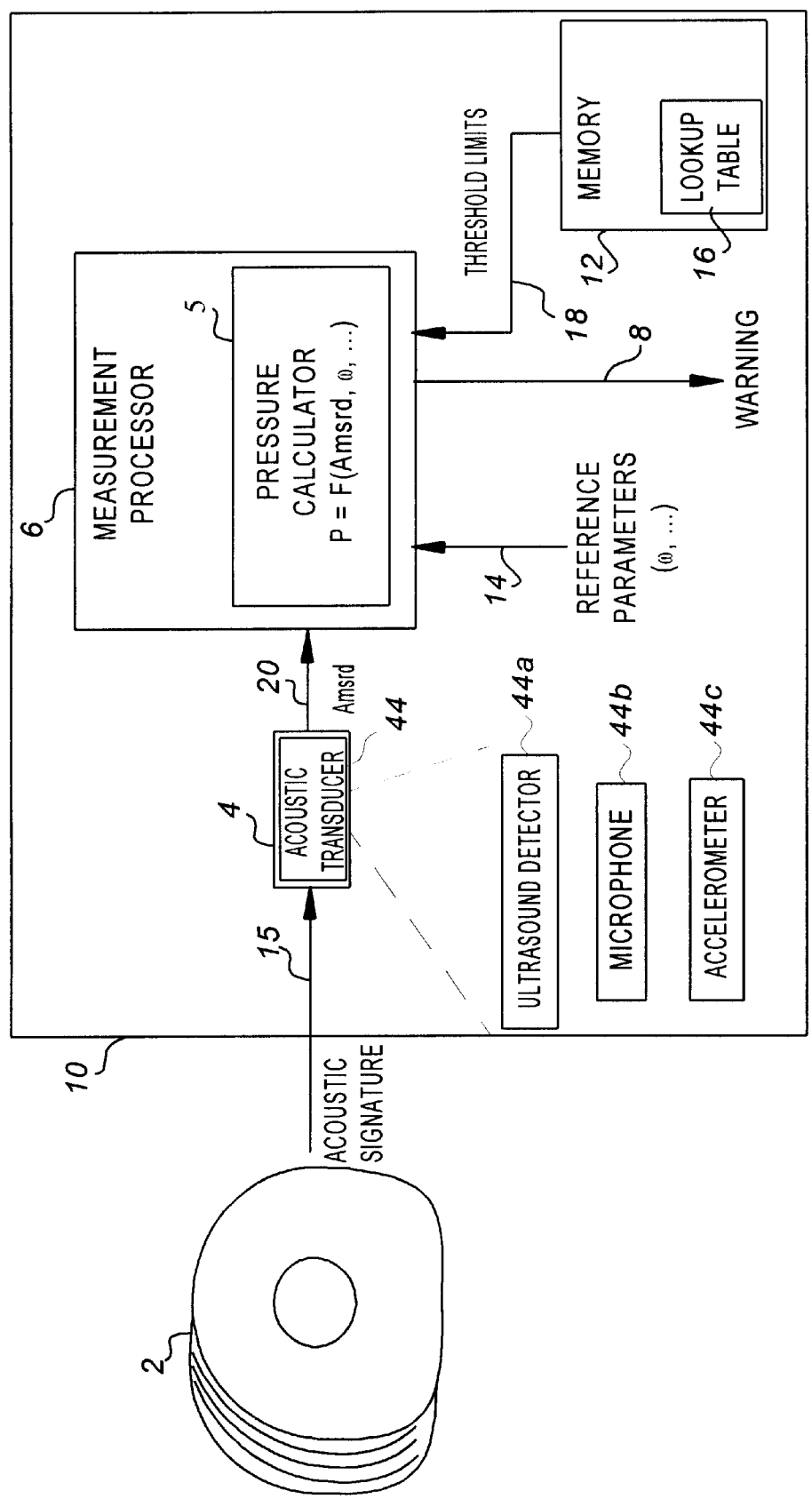
FIG. 2(b) is a block diagram of a second embodiment of a system implemented in accordance with the invention.

In the second illustrative embodiment shown in FIG. 2B, an acoustic transducer 44 is used to measure the tire temperature. As known by those skilled in the art, an acoustic transducer is a device that converts sound waves into electrical signals such as currents or voltages, and visa versa. For example, acoustic transducer 44 may be implemented with an ultrasound detector 44a mounted fixedly in close proximity to, but remote from, the rotating tire. The ultrasound detector 44a detects sound in the ultrasound range from the tire and converts the sound waves into electrical signals. The acoustic transducer 44 may also be implemented using a microphone 44b, which detects sound from the tire around the 20 Hz to 20 KHz range and converts it to electrical signals. In another embodiment, acoustic transducer 44 is implemented with an accelerometer 44c that is mounted on the mechanical support assembly of the vehicle on which the tire is mounted. The rotating tire vibrates at a resonant frequency, which is different for different tire pressures of a given tire. The difference in the acoustic signature between the expected "normal" range and a predetermined "out-of-normal" range threshold, is easily monitored using the acoustic transducer 44. The difference is easily detectable because the resonant frequency of the tire, which is excited by tire rotation, is proportional to the square root of the tire pressure, and measuring frequency shift is know to be easily accurately measured.

Figure 2C:
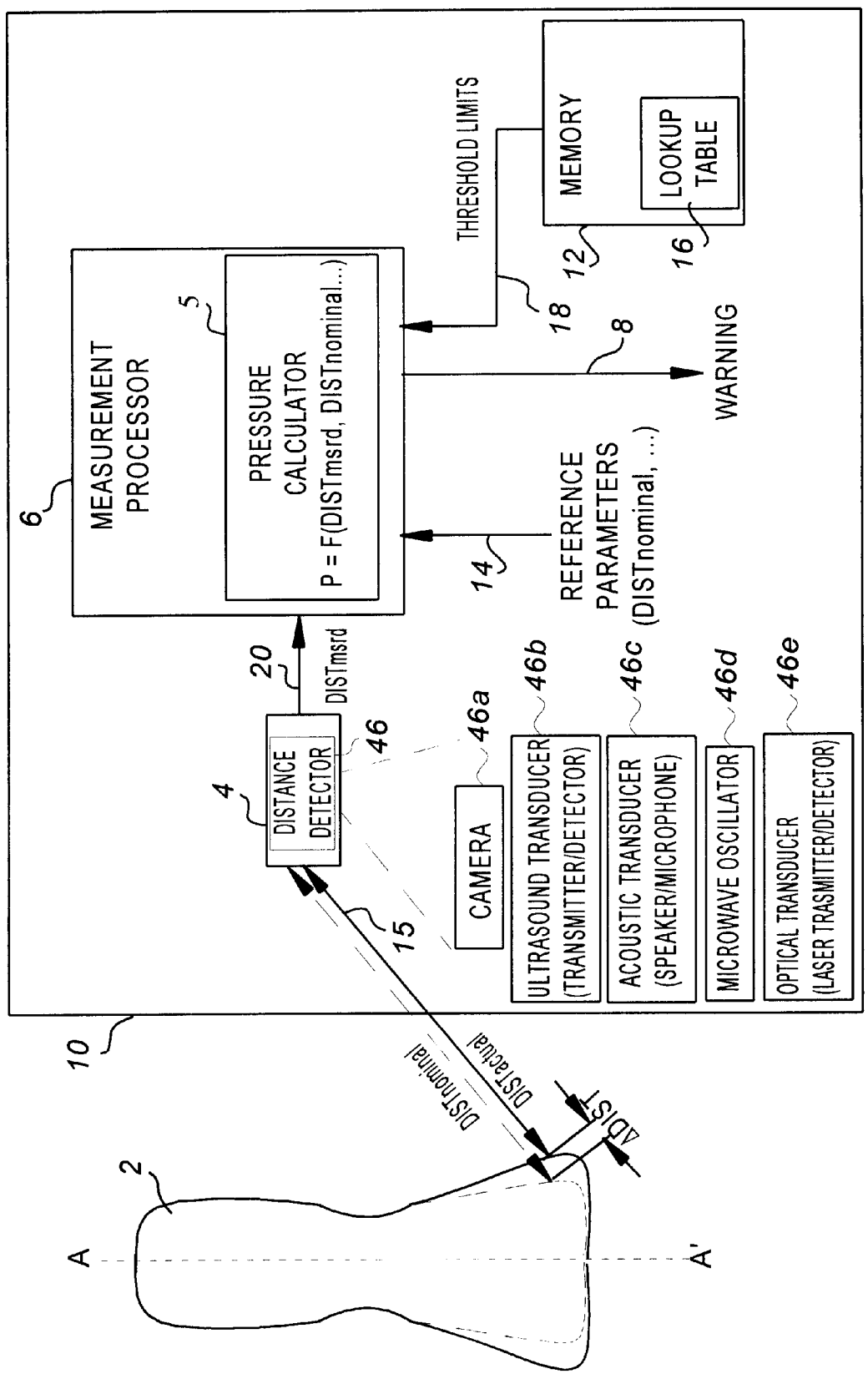
FIG. 2(c) is a block diagram of a third embodiment of a system implemented in accordance with the invention.
Figure 2D:
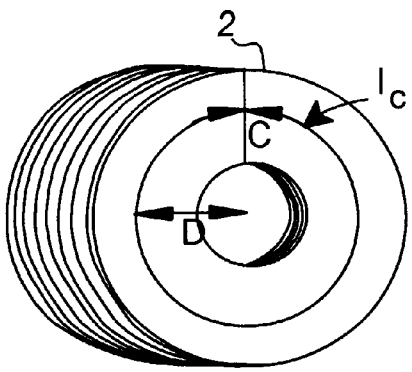
FIG. 2(d) is a perspective view of a tire, illustrating the parameters required in the calculation of the dominant circumferential modes of the tire's acoustical signature.
Figure 2E:
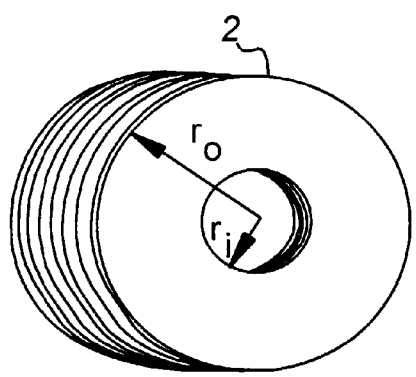
FIG. 2(e) is a perspective view of a tire, illustrating the parameters required in the calculation of the radial modes of the tire's acoustical signature.
Figure 2F:
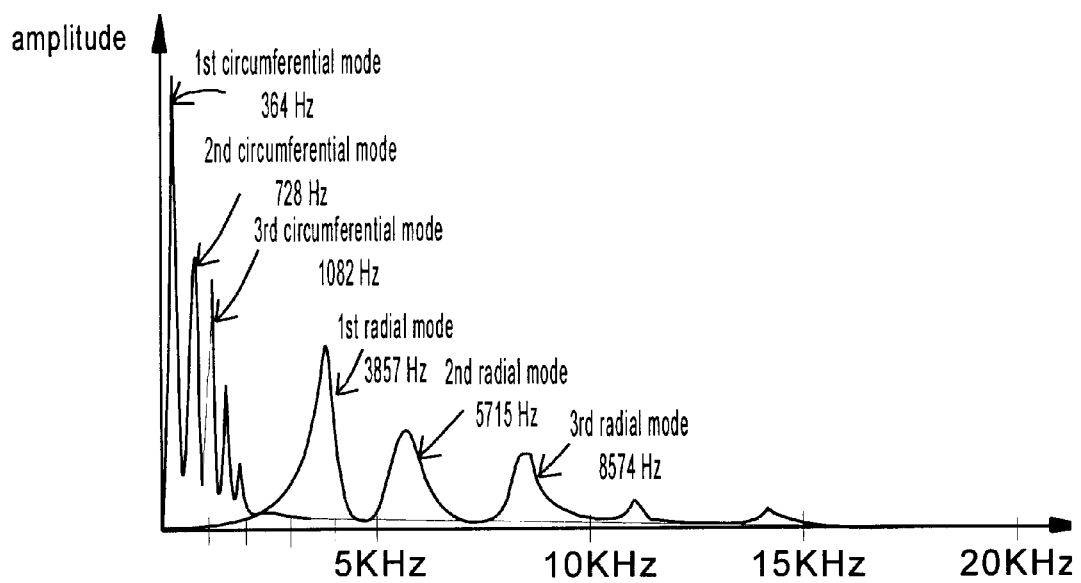
FIG. 2(f) is a frequency spectrum illustrating example dominant circumferential and radial modes of an example acoustical signature.

FIGS. 2(d)–2(f) illustrate the measurement techniques of an acoustical signature. FIG. 2(d) is a perspective view of tire 2, illustrating the parameters required in the calculation of the dominant circumferential modes of the tire's acoustical signature. As illustrated, these parameters include the mean diameter of the toroidal air chamber D and the mean circumferential length $I_c = D*\pi$. The dominant circumferential modes exist where the circumferential standing wave pattern beginning and ending at point C in the inner toroidal cavity occur at some amplitude and phase. These modes occur when the path length from point C around the mean circumference of the inner toroidal cavity and back to C is an integral number of the wavelength in the tire (i.e., circumferential modes occur at $n*\lambda_{cir}$, where $n=\{1, 2, 3, 4, \ldots\}$. The frequency $F_{cir}$ corresponding to a wavelength $\lambda_{cir}$ is defined as $F_{cir}=Vs/\lambda_{cir}$, where Vs is the speed of sound the tire chamber. Vs is defined as:

$$Vs = v\sqrt{Pr},$$

where Pr is the normalized pressure (i.e., normalized to 1 atmospheric pressure unit (atm)), and v is the velocity of sound at 1 atm. The tire pressure is normalized to 1 atm (equal to approximately 15 pounds per square inch (PSI)). For example, if the tire is inflated to 30 PSI (corresponding to an absolute pressure of 45 PSI), the normalized tire pressure Pr is Pr=45 PSI/15 PSI=3. To find the resonant conditions for the circumferential dominant modes, the wavelength $\lambda_{cir}$ is set to $\lambda_{cir}=n*Ic=n*D*\pi$, where $n=\{1, 2, 3, 4, \ldots\}$. As an example, suppose Pr=3 (for a tire filled to 30 PSI, its absolute pressure P=45 PSI), D=20 inches, Vs=12*1100 inches/sec, then the lowest order circumferential mode (i.e., n=1) is:

$$F_{cir1} = \frac{\sqrt{3}*12*1100}{1*20*\pi} = 364 \text{ Hz}$$

The next lowest order circumferential mode (i.e., n=2) is:

$$F_{cir2} = \frac{\sqrt{3}*12*1100}{2*20*\pi} = 728 \text{ Hz}$$

The other circumferential modes are calculated in a similar manner, substituting the value of the mode for n. FIG. 2(f) is a frequency spectrum illustrating the circumferential modes of the predicted acoustical signature for this example. Thus, if the tire loses pressure by 1 PSI, then Pr=(44/15), and $$F_{cir1} = \frac{\sqrt{44/15}*12*1100}{1*20*\pi} = 360 \text{ Hz}$$

Thus, the change in first order circumferential mode frequency is $\Delta F=F_{PSI=45}-F_{PSI=44}=364$ Hz−360 Hz=4 Hz, resulting in a percent change of $\Delta F/F=4/364=0.011 =1.1\%$, which is known in the art to be easily detectable.

FIG. 2(e) is a perspective view of tire 2, illustrating the parameters required in the calculation of the dominant radial modes of the tire's acoustical signature. As illustrated, these parameters include the inner radius of the tire $r_i$, and the outer radius of the tire $r_o$, and the mean radial length $I_r=r_o-r_i$. The dominant radial modes exist where the radial standing wave pattern beginning at a point D on the inner surface of the inner toroidal cavity and ending at point E on the outer surface of the inner toroidal cavity occur at some amplitude and phase. These modes occur when the path length from point D radially out to point E is an integral number of half a wavelength in the tire (i.e., radial modes occur where $I_r=r_o-r_i=n*(\lambda_{rad}/2)$, where $n=\{1, 2, 3, 4, \ldots\}$, $r_0$ is the outer diameter of the toroidal air chamber, $r_I$ is the inner diameter of the toroidal air chamber, and $\lambda_{rad}=V_s/F_{rad}$. The frequency $F_{rad}$ corresponding to a wavelength $\lambda_{rad}$ is defined as:

$$F_{rad} = \frac{\sqrt{Pr}*Vs}{n*2(r_o - r_i)}.$$

To find the resonant conditions for the dominant radial modes, the wavelength $\lambda_{rad}$ is set to $\lambda_{rad}=n*I_r=n*2*(r_o-r_i)$, where $n=\{1, 2, 3, 4, \ldots\}$. As an example, suppose Pr=3 (for a tire filled to 30 PSI, its absolute pressure P=45 PSI), $r_o=12$ inches, $r_i=8$ inches, and Vs=12*1100 inches/sec, then the lowest order radial mode (i.e., n=1) is:

$$F_{rad1} = \frac{\sqrt{3}*12*1100}{1*2*(12-8)} = 2{,}857 \text{ Hz}$$

The next lowest order radial mode (i.e., n=2) is:

$$F_{rad2} = \frac{\sqrt{3}*12*1100}{2*2*(12-8)} = 5715 \text{ Hz}$$

The other radial modes are calculated in a similar manner, substituting the value of the mode for n. FIG. 2(f) illustrates the radial modes of the predicted acoustical signature for this example.

Where the measured parameter is the temperature $T_{msrd}$ or acoustical signature $A_{msrd}$, the parameter signal of interest 15 (i.e., tire temperature or acoustical signature) is produced by the rotation of the tire 2 and accordingly the measurements $T_{msrd}$ and $A_{msrd}$ must be taken while tire 2 is rotating. Preferably, the parameter measurement in these embodiments are taken only when the vehicle has been in cruise control for a predetermined amount of time in order to ensure that certain variables that complicate the pressure calculation, such as temperature transients arising from frictional forces between the tires and pavement when the rotational speed of the tires change, can be disregarded. In other words, when the vehicle is operating in cruise control, the flexure rate, friction between the road and tire, and air speed cooling effects are all held relatively constant, thereby simplifying the tire pressure calculation.

In the third illustrative embodiment shown in FIG. 2C, a distance detector 46 is used to determine the tire temperature. Distance detector 46 may be implemented using a variety of devices, including a camera 46a, an ultrasound transmitter/detector 46b, a speaker/microphone 46c, a microwave oscillator 46d, or a laser transmitter/receiver 46e. When distance detector 46 is a camera 46a, image processing means, which are well-known in the art, are used to determine the distance between the detector 46 and a predetermined point on the tire. When distance detector 46 is implemented using an ultrasound transmitter/detector 46b or speaker/microphone 46c, the difference in time between the expected returning sound and the actual returning sound is used to calculate a change in distance. When distance detector 46 is implemented using microwave oscillator 46d the oscillator is designed and positioned so that the tire becomes a tuning element in the oscillator frequency. A phase shift in the oscillator's output signal due to a shift in the tire's sidewall position is used to determine the distance to the tire. When distance detector 46 is implemented using an optical transmitter/detector 46e, the difference in time between the expected returning laser pulse and the actual returning laser pulse is used to calculate a change in distance. In each case, the calculated distance to the tire is indicative of the tire displacement due to pressure variations, and is used to calculate and/or infer the tire pressure.

Figure 6A:
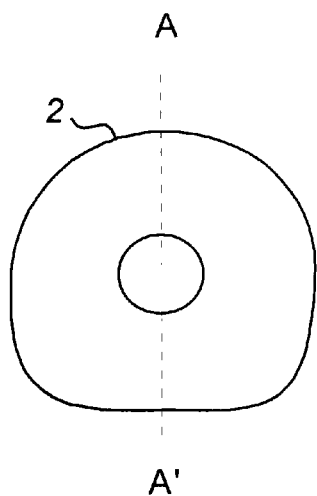
FIG. 6A is a side view of a tire.
Figure 6B:
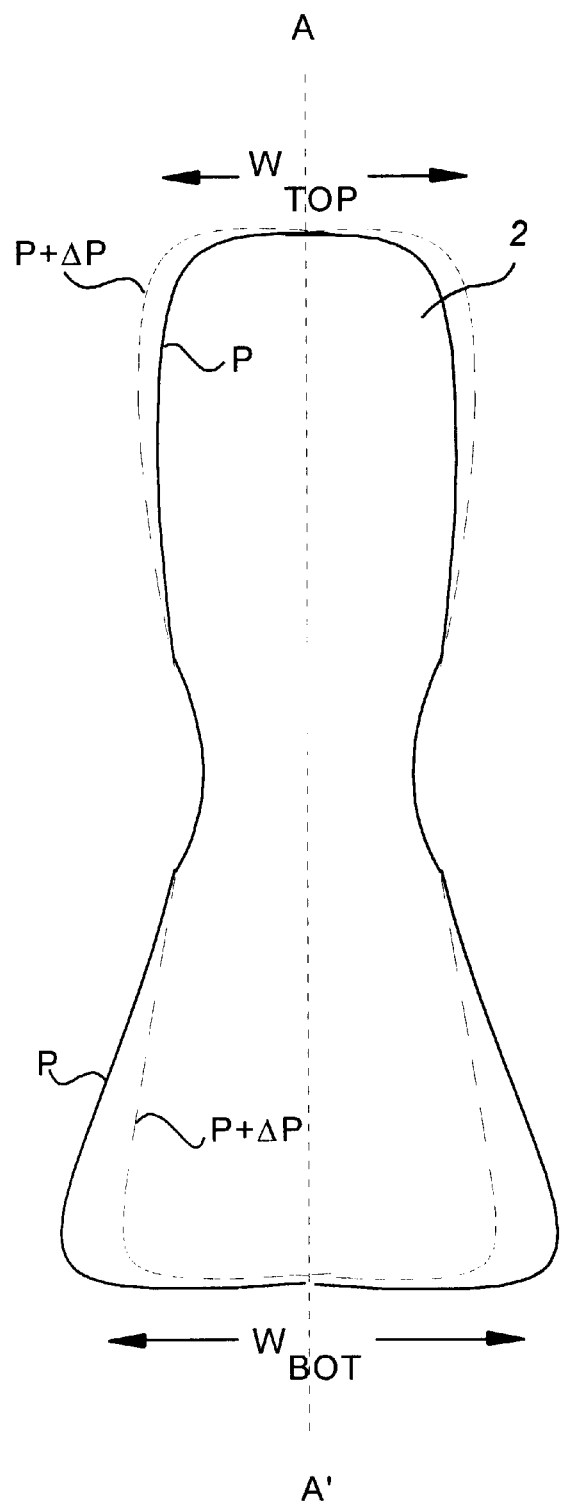
FIG. 6B is a view of a cross-sectional slice of the tire illustrated in FIG. 6A.

As just described, in the embodiment of FIG. 2C, where the shape of the tire is monitored, for example the width of the tire along the bottom portion of the tire (i.e., that portion in contact with the pavement), the tire pressure is inferred from the measured parameter $DIST_{msrd}$. FIG. 6B is a cross-sectional slice A—A of tire 2 shown in a side view in FIG. 6A. As known by those skilled in the art, as the pressure of the tire decreases, the width $W_{BOT}$ of the tire at the bottom portion increases due to the pressure of force exerted on the bottom of the tire by the pavement. This is illustrated by the shape of the tire 2 indicated at P. Conversely, as the pressure of the tire increases, the width $W_{TOP}$ of the tire at the top portion increases. This is illustrated by the shape of tire 2 indicated at P+)P. The increase in tire width (whether at the top $W_{TOP}$ or bottom $W_{BOT}$ of the tire) may be remotely sensed in a variety of ways, including a camera 46a used to measure the relative position of the tire wall with respect to the position of the hub; an ultrasound device 46b for determining the echo location of the rubber surface of the tire wall with respect to the ultrasound device, a speaker/microphone combination 46c, a microwave oscillator 46d used to tune the microwave oscillator frequency according to the proximity of the rubber tire relative to the position of the oscillator, or a laser transmitter/receiver combination 46e. Also, if greater accuracy is required, the width $W_{TOP}$ of the top of the tire 2 can be measured as well, and the difference (i.e., $W_{BOT}-W_{TOP}$) can be used as the input variable for the pressure calculation.

Where the measured parameter $DIST_{msrd}$ is the shape of the tire 2, parameter measurements may be taken at any speed of tire rotation, including zero (i.e., while the tire is stationary). Measurement processor 6 monitors the measured parameter 20 obtained by sensor 4, determines whether the measured parameter 20 is within acceptable limits, and generates a warning signal 8 if the measured parameter 20 is not within the acceptable limits. Optionally, an additional alarm can be signaled if the tire temperature or pressure of a single tire is out of the average by a specified amount. For example, an alarm signal could be generated if any one tire is +/−20% of the average temperature or pressure.

Figure 3:
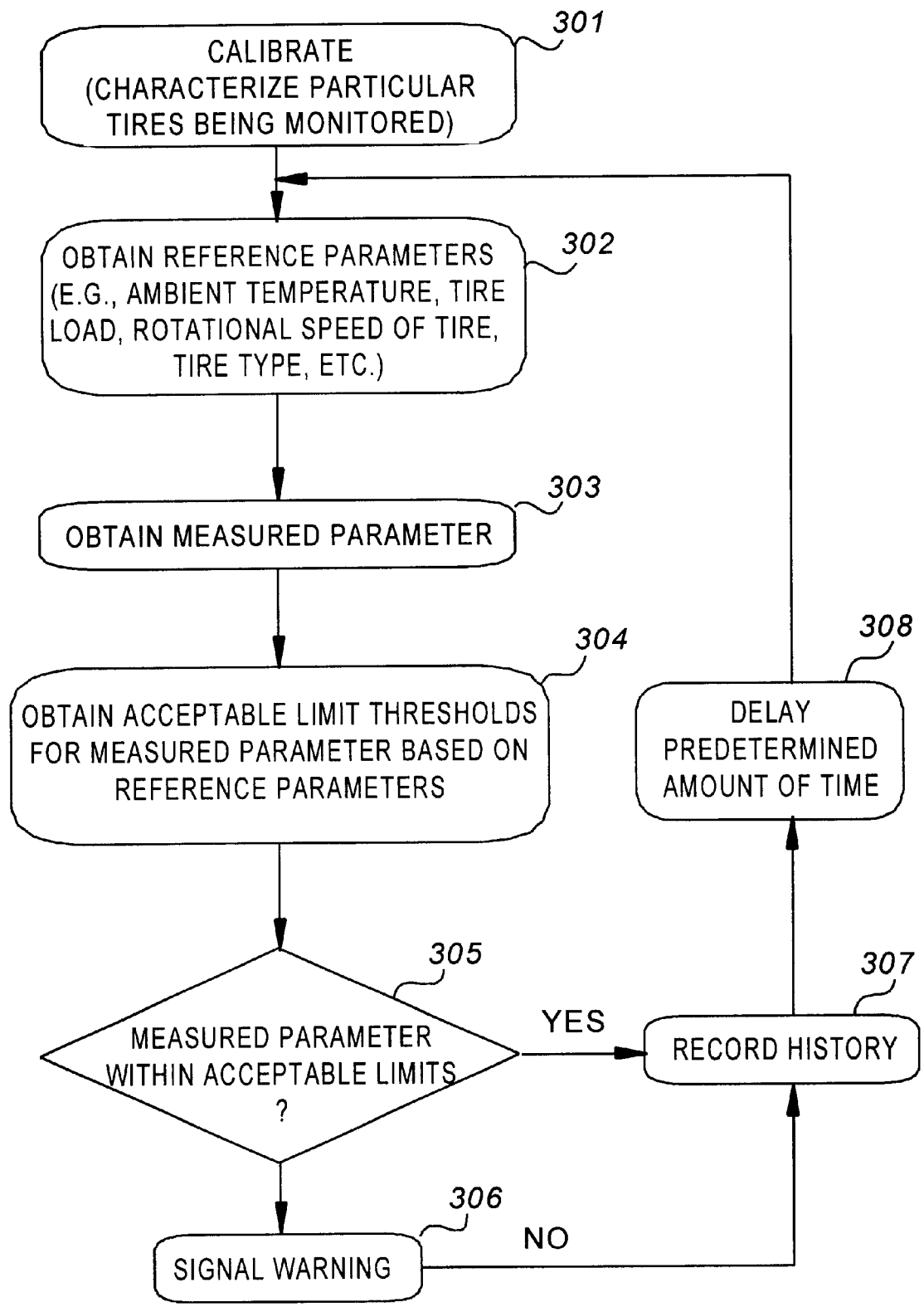
FIG. 3 is an operational flowchart of the steps performed by one embodiment of a measurement processor in accordance with the invention.

FIG. 3 is an operational flowchart of the steps performed by measurement processor 6. In the illustrative embodiment, the sensor 4 is calibrated 301 to the particular tire 2 being measured. For example, if the shape of the tire 2 is the parameter 15 being measured, the relative distance $DIST_{nominal}$ from the sensor (e.g., camera, IR sensor, ultrasonic transducer, etc.) is measured at various tire pressures from which a set of threshold limits 18 are determined. This step is typically performed at the factory and the calibrated measurements and set of threshold limits 18 are preferably programmed into a non-volatile memory 12. Once the sensor 4 has been calibrated, tire parameter monitoring may begin. Measurement processor 6 obtains 302 a set of reference parameters 14 such as the outside temperature, speed of rotation of the tire, load on the tire, tire type, etc. Measurement processor 6 obtains 303 a parameter measurement 20 from sensor 4. Measurement processor 6 then references a lookup table 16 stored in a memory 12 to obtain 304 a set of threshold limits 18 of the acceptable limits for the measured parameter 20 based on the reference parameters 14 that match the conditions under which the measured parameter 20 was measured. Measurement processor 6 compares 305 the value of the measured parameter 20 to the set of threshold limits 18 and determines whether the measured parameter 20 is within the threshold limits 18 corresponding to the acceptable limits for the parameter 15 when measured under the conditions, defined by the reference parameter 14, under which the measured parameter 20 was measured. If the measured parameter 20 is not within the acceptable limits as defined by the set of threshold limits 18 that correspond to the particular reference parameters 14 under which the parameter 15 was measured, measurement processor 6 generates 306 a warning signal 8. Preferably, the measured parameter 20 is recorded 307 in a history buffer 22 for historical analysis purposes, for example trend analysis performed by trend analyzer 24. The process is repeated after delaying 308 a predetermined length of time has passed. Preferably the predetermined length of time is programmable and increases in period once a trend condition 26 is detected by trend analyzer 24 or an out-of-limits condition is detected by measurement processor 6.

Figure 4:
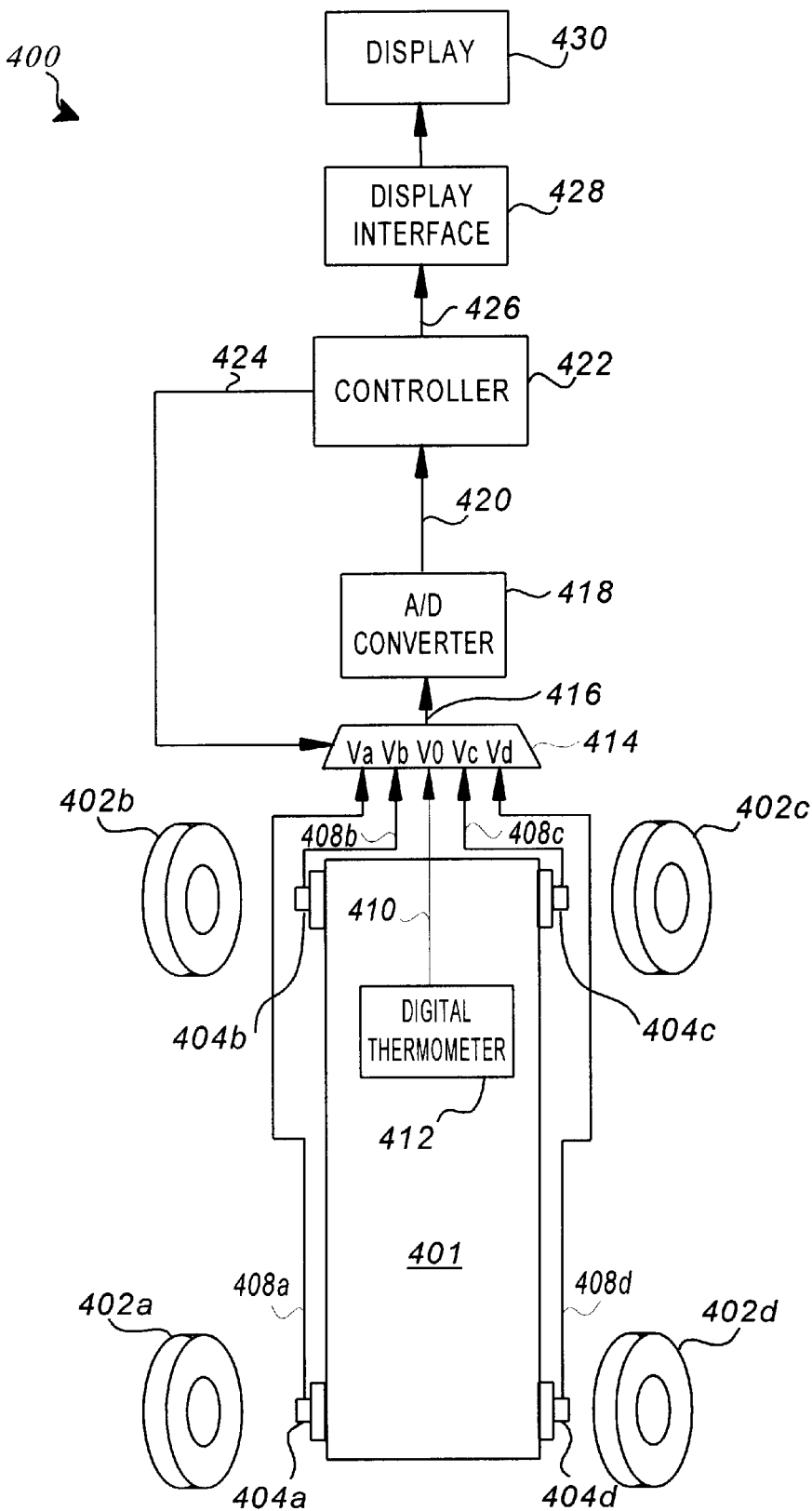
FIG. 4 is a block diagram of a vehicular system implementing an application of the invention.

FIG. 4 is a block diagram of a vehicular system 400 implementing an illustrative application of the invention. Four infrared (IR) detectors 404a, 404b, 404c, 404d are mounted on the block 401 of vehicle 400 in respective proximity to four tires 402a, 402b, 402c, 402d. Each IR detector 404a, 404b, 404c, 404d measures the temperature of its respective tire 402a, 402b, 402c, 402d and outputs a respective voltage Va, Vb, Vc, Vd on respective lines 408a, 408b, 408c, 408d. The temperature $T_{msrd}$ is output on lines 408a, 408b, 408c, 408d in terms of mVolts per degree Kelvin. A digital thermometer 412 measures the ambient (outside) temperature $T_{ambient}$ of the vehicle surroundings and outputs a voltage V0 that represents the ambient temperature reading on a line 410. Lines 408a, 408b, 408c, 408d, and 410 are input to a multiplexer 414 that is controlled by controller 422 via control signal 424. Multiplexer 414 outputs one of input voltages Va, Vb, Vc, Vd, or V0 on output line 416 in analog form as selected by controller 422 on control line 424. Analog-to-digital (A/D) converter 418 converts the selected analog voltage received on multiplexer output line 416 to a digital representation output on A/D output line 420. Controller 422 receives the requested voltage input Va, Vb, Vc, Vd, or V0 in digital form from line 420, and if the requested voltage input is Va, Vb, Vc, or Vd, performs threshold calculations and generates display information 426 pertaining to the measured temperature $T_{msrd}$ of the respective tire 402a, 402b, 402c, or 402d to which the requested voltage input Va, Vb, Vc, or Vd corresponds.

Figure 5:
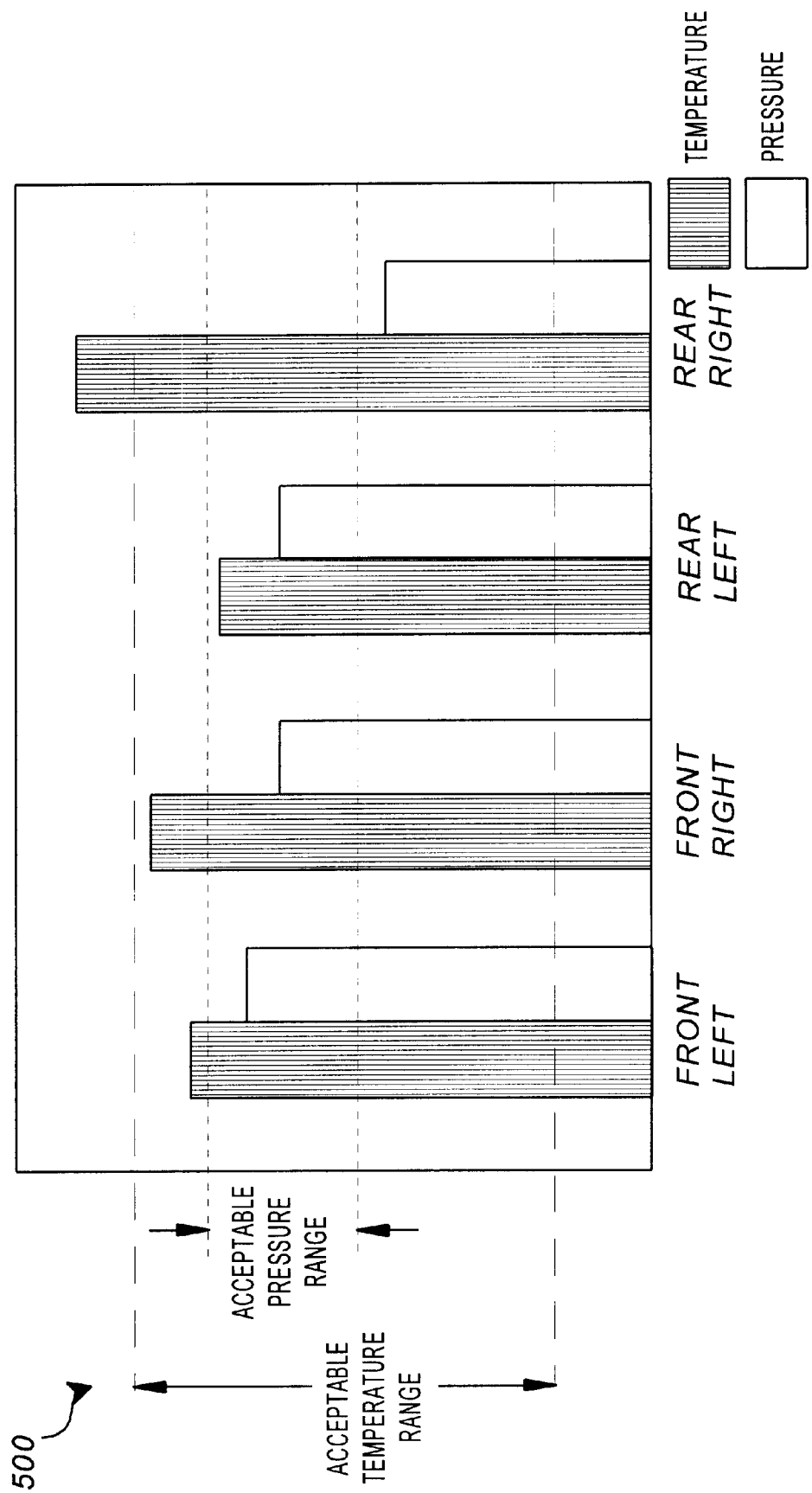
FIG. 5 is an example embodiment of a graphical output illustrating the current temperature of each of the tires.

Display interface 428 processes display information 426 and outputs it to a display 430. Display 430 is preferably located on the vehicle's dashboard and may take the form of a warning light indicating that a tire pressure needs attention, or may be a more extensive graphical output illustrating the current temperature of each of the tires as illustrated in FIG. 5. Graphical output 500 is implemented as four parallel bar graphs which represent the temperature and/or pressure of each of the four tires 402a, 402b, 402c, 402d. The advantage of illustrating the temperature and/or pressure in graphical form such as that shown at 500 is that since all four tires are under the same load, and one of the tires hits a nail for example, the temperature of that tire increases before it blows out. If one tire becomes hotter than rest of the tires, this is easily visible by the driver of the vehicle 401.

It will be appreciated by those skilled in the art that the advantages provided by the invention are multifold. By monitoring a tire parameter that is indicative of the tire pressure such as temperature, acoustical signature, or shape, tire failures can be avoided. Furthermore, because the tire parameter is measured by a truly remote sensor, no device or mechanism need be installed within or on the tire itself. The system of the invention thus reduces the design complexity and number of required components, and reduces the potential for system failure due to the exposure of system components to the harsh mechanical and thermal conditions if mounted inside or on the tire itself. Finally, the invention allows the pressure of the tire to be monitored while the tires are rotating, allowing the vehicle operator to be warned of potential failure conditions as they arise.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. An apparatus for remotely monitoring a parameter of a tire, said apparatus comprising:

an acoustical transducer located remotely from said tire which detects and converts vibrational sound waves from said tire into an electrical signal indicative of an acoustical signature of said tire;

a measurement processor which monitors said electronic signal, compares said monitored electronic signal with a set of acceptable threshold limits for said electronic signal, and generates a warning signal if said monitored electronic signal is not within said set of acceptable threshold limits.

2. An apparatus in accordance with claim 1, wherein: said parameter comprises a pressure of said tire.

3. An apparatus in accordance with claim 1, wherein: said acoustical transducer comprises an ultrasound detector.

4. An apparatus in accordance with claim 1, wherein: said acoustical transducer comprises a microphone.

5. An apparatus in accordance with claim 1, wherein: said acoustical transducer comprises an accelerometer.

6. A method for detecting an unacceptable condition of a tire, comprising:

remotely detecting vibrational sound waves from said tire;

converting said detected vibrational sound waves into an electrical signal indicative of an acoustical signature of said tire;

comparing said electronic signal with a set of acceptable threshold limits; and generating a warning signal if said electronic signal is not within said set of acceptable threshold limits.

* * * * *